United States Patent [19]

Blincow et al.

[11] 4,296,321
[45] Oct. 20, 1981

Best Available Copy

[54] BIT PRESSURE GAUGE FOR WELL DRILLING

[75] Inventors: Donald W. Blincow, Claremont; Kevin H. Cassedy, Laguna Beach; Samuel C. Dominey, Jr., Glendora, all of Calif.

[73] Assignee: Tyco Laboratories, Exeter, N.H.

[21] Appl. No.: 146,207

[22] Filed: May 5, 1980

[51] Int. Cl.³ .............................................. G01V 5/00
[52] U.S. Cl. .................................... 250/254; 250/262
[58] Field of Search ............... 250/253, 254, 256, 262, 250/269

[56] References Cited

U.S. PATENT DOCUMENTS 2,728,554 12/1955 Goble .................................. 250/254

Primary Examiner—Alfred E. Smith
Assistant Examiner—Janice A. Howell

[57] ABSTRACT

Apparatus for measuring pressure on a well drilling bit which bit is connected to the drilling platform at the surface by a string of drill pipe, typically in a slant drilling configuration. The apparatus is inserted in the drill string and includes first and second sections of drill pipe with telescoping ends and a spring positioned therebetween urging one section away from the other. A radioactive source is mounted in one of the sections and a probe carrying a radioactive detector is positioned within the drill pipe, with a window in the other section of pipe providing a radiation path between the source and detector. Pressure on the drill bit varies the compression force on the spring permitting one section of pipe to move relative to the other and thereby vary the position of the window in the path between the radiation source and detector. The output of the detector varies as a function of window position and hence as a function of pressure on the drilling bit. The detector output is calibrated in pressure and may be displayed analog or digital as desired.

6 Claims, 5 Drawing Figures

BIT PRESSURE GAUGE FOR WELL DRILLING

BACKGROUND OF THE INVENTION

This invention relates to well drilling apparatus, such as that used in drilling oil wells, and in particular to a new and improved apparatus for measuring the pressure on the drill bit.

In a typical well drilling rig, a drill bit is positioned at the lower end of a string of drill pipe, with the drill bit being driven by a motor actuated by mud pumped down the drill pipe. There is an optimum pressure which should be applied to the drill bit for maximum efficiency in drilling. Operating at a lower pressure means slower drilling, while operating at a higher pressure runs the risk of damage to the bit. Hence it is desirable that the operators on the surface of the ground at the drilling platform know the pressure on the drill bit so that drilling speed can be optimumly controlled.

In the past, pressure of the mud at the drill motor has been measured by lowering a sensor down the interior of the string of pipe. This does give a measure of pressure of the mud at the drill motor, and attempts have been made to relate this to pressure on the drill bit, but such have not been satisfactory. The problem is particularly difficult when angle drilling is being carried out, since the actual pressure on the bit is a combination of that due to mud pressure and that due to the weight of the string of drill pipe.

It is an object of the present invention to provide a new and improved apparatus for measuring the pressure on the drill bit in a well drilling apparatus. A further object is to provide such an apparatus which is especially suited for operation with angle drilling operations.

A further object is to provide such an apparatus which will measure the pressure adjacent the bit in the bottom of the hole and provide an indication of pressure at the surface for direct reading by the operator. An additional object is to provide such an apparatus which utilizes simple and reliable components which can be utilized in the area adjacent the drill bit.

These and other objects, advantages, features and results will more fully appear in the course of the following description.

SUMMARY OF THE INVENTION

The apparatus provides for measuring the pressure on a well drilling bit which is connected to a drilling platform at the surface of the ground by a string of drill pipe. First and second sections of drill pipe having telescoping ends are installed in the drill string adjacent the drill bit, with a spring positioned between the sections urging one away from the other. A probe of conventional design is positioned within the sections of drill pipe, with a radioactive detector mounted in the probe. A radioactive source is positioned in the outer of the telescoping sections of drill pipe, with a window in the inner of the sections providing a radiation path between the source and detector. With this configuration, the radiation intensity at the detector from the source is a function of the position of the window and hence of the distance between the two sections which is turn is a function of the pressure on the drill bit. A circuit is provided for converting the output of the radiation detector to an electrical signal, which signal is transmitted to the surface and displayed or recorded as desired, with this signal being calibrated in terms of pressure.

DESCRIPTION OF THE PREFERRED EMBODIMENT

Figure 1:
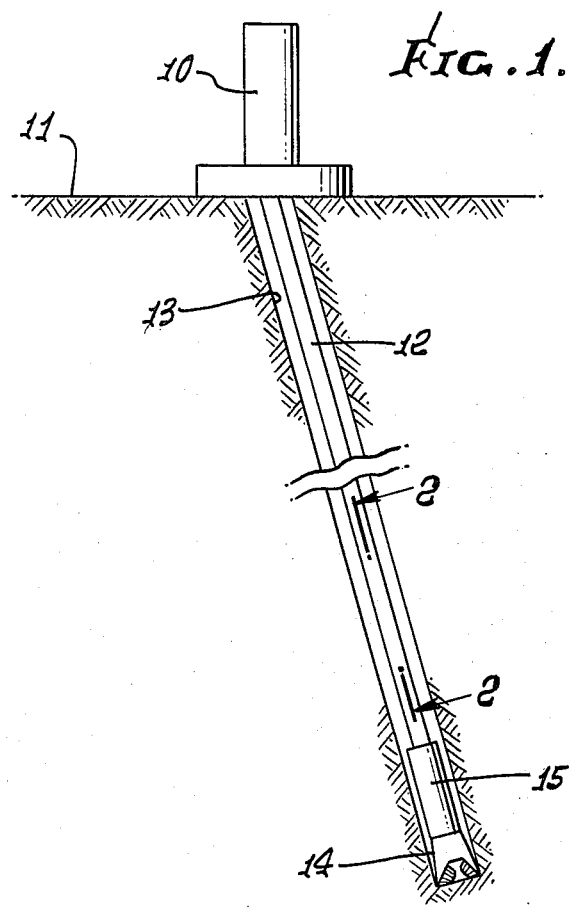
FIG. 1 is a diagrammatic illustration of a typical well drilling set up.
Figure 4:
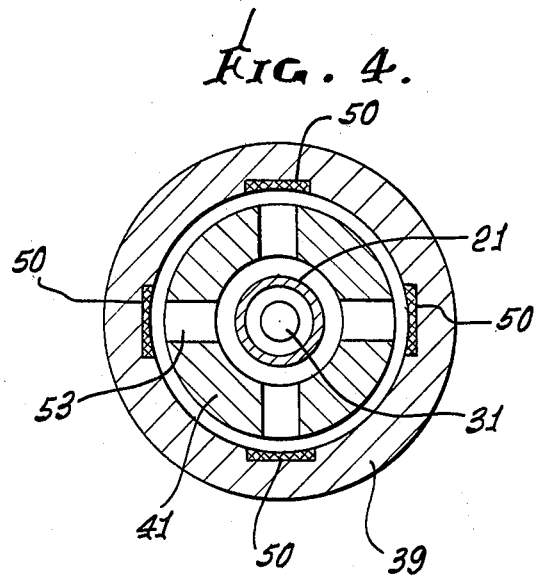
FIG. 4 is a sectional view taken along the line 4—4 of FIG. 3.

A typical well drilling installation is illustrated diagrammatically in FIG. 1, with a drilling platform 10 at the surface of the ground 11. A string of drill pipe 12 extends downward through the hole 13, with a drill bit 14 at the lower end of the drill string. Drilling mud is pumped down the interior of the string of drill pipe to power a motor 15 which actuates the drill bit, with the mud then moving upward through the hole around the drill pipe carrying dirt, rock, etc. upward out of the hole.

Figure 2:
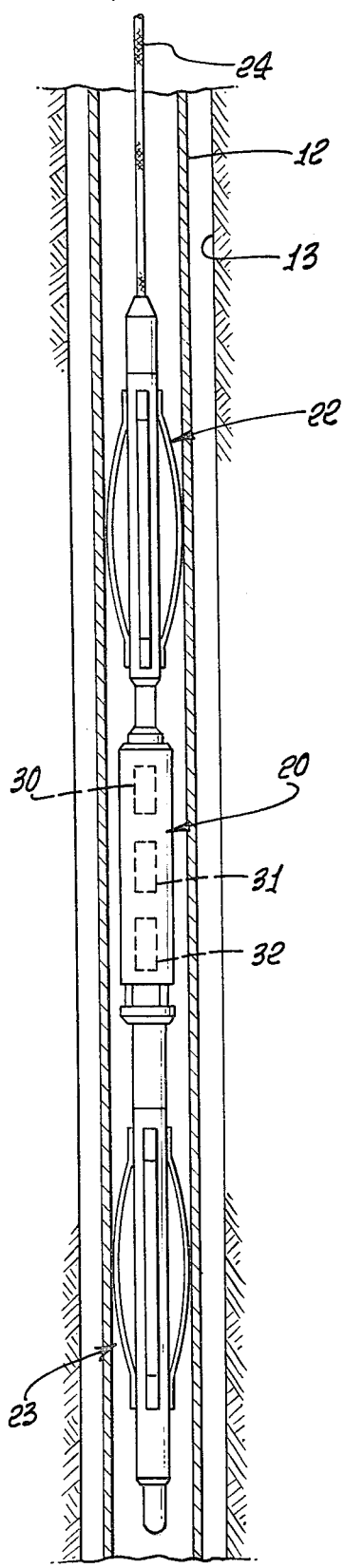
FIG. 2 is an enlarged sectional view of the portion of drill string indicated by the circle 2 of FIG. 1.

FIG. 2 illustrates the portion 2 of FIG. 1, with an instrument probe 20 located within the pipe 12. The probe may be conventional in construction and includes an instrument housing 21 positioned between centralizer units 22, 23 which are utilized to maintain the housing generally centered within the pipe. The probe is suspended from a wire rope 24 which provides for lowering the probe into and raising the probe out of the well. Electrical connections to the instruments in the housing are provided by an electrical cable which typically is carried in the wire rope 24.

A typical probe carries a number of sensors for determining the position of the drill bit and other parameters related to drilling. The signals from these various sensors are multiplexed for transmission to the surface, where the signals are demultiplexed and utilized for providing various displays, controls, and the like.

Figure 3:
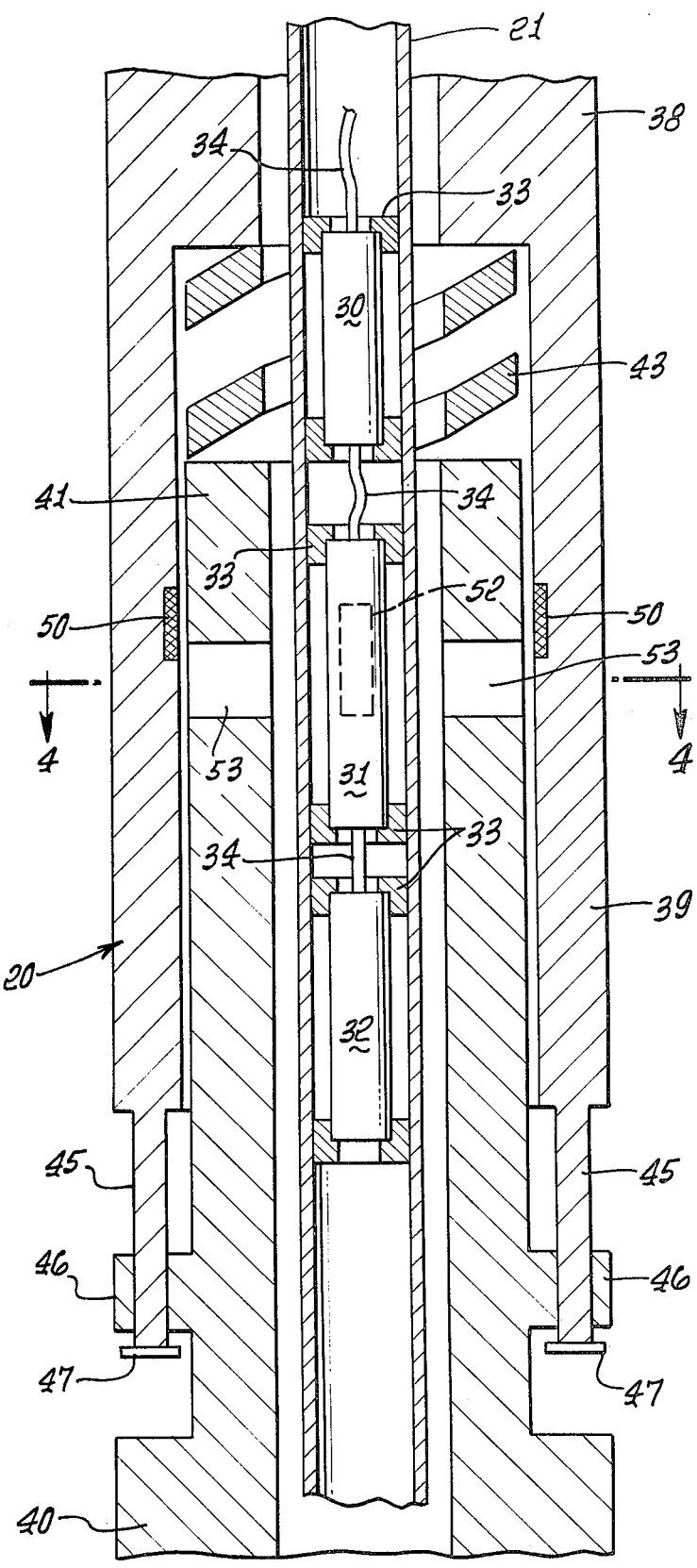
FIG. 3 is an enlarged sectional view of a portion of FIG. 2, illustrating the presently preferred embodiment of the pressure measuring apparatus.

An enlarged portion of the instrument housing 21 of the probe and adjacent sections of drill pipe is shown in FIG. 3. Instrument packages 30, 31, 32 are positioned within the probe housing 21, typically supported on rings 33 and interconnected by cables 34.

A section 38 of drill pipe has an end 39 with an enlarged inner diameter. Another section 40 of drill pipe has an end 41 with a reduced outer diameter, so that the end 41 slides within the end 39. A spring 43 is positioned between the ends 39, 41, urging the section 40 away from the section 38. Shafts 45 may be provided on the end 39, riding in openings in bosses 46 of the end 41, with enlarged caps 47 on the shafts 45, for limiting movement of the section 40 away from the section 38.

Radioactive sources 50 are provided in the inner wall of the end section 39. One such source may be utilized, but it is preferred to provide three or four of the sources substantially equally spaced about the periphery in order to achieve better balance of operation regardless of the radial position of the probe within the drill string. A radiation detector 52 is mounted in the package 31. Radiation transmission windows, typically openings 53, are provided in the end section 41, to provide radiation paths from the sources to the detector.

Figure 5:
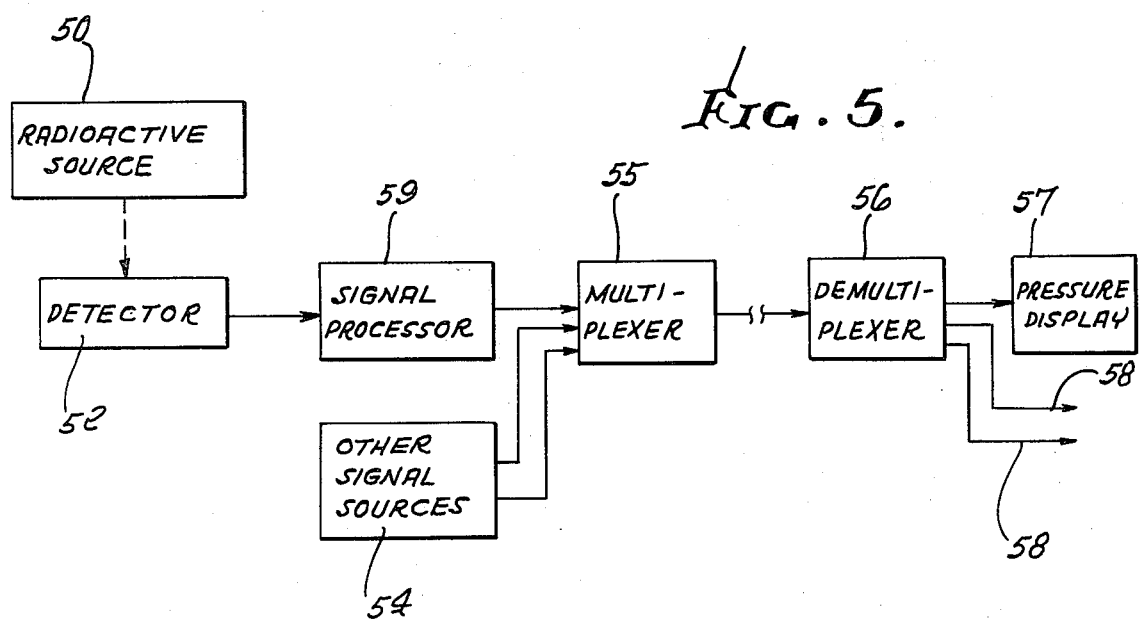
FIG. 5 is an electrical block diagram of the apparatus of FIG. 3.

Referring to the electrical diagram of FIG. 5, the output of the detector 52 is connected to a signal processor 59 which provides as an output an electrical signal varying as a function of the radiation intensity at the detector 52. Typically this output is in the range of 0 to 5 volts DC. Signals from other sensors within the probe, indicated generally at 54, are also connected to he multiplexer 55 located within the probe. The multiplexer output is connected via the electrical cable to a demultiplexer 56 at the surface. The demultiplexed signal from the signal processor 53 is connected to a pressure display unit 57 which may be calibrated to indicate pressure in pounds or pounds per square inch, in analog form or digital form as desired. Other outputs from the demultiplexer 56 on lines 58, are connected to other displays or control units as desired.

The radioactive source 50, the detector 52, and the signal processor 53 may be conventional radiation components. The multiplexer 55 and demultiplexer 56 may be conventional well probe components, and the display unit 57 may be a conventional display unit.

The operation of the system will be described in conjunction with FIG. 3. As the pressure on the drill bit increases, the section 40 will move toward the section 38, compressing the spring 43. As the pressure on the bit decreases, the section 40 will move away from the section 38. Hence the relative movement of the two sections is a function of pressure on the bit, and the operating range of the apparatus can be varied by varying the parameters of the various components, particularly the spring 43.

As the drill string sections move toward and away from each other, the windows 53 are moved relative to the sources 50 and detector 52. Hence the amount of radiation received at the detector varies as a function of compression of the spring 43 and hence of the pressure on the drill bit. Therefore the radiation detector output varies as a function of drill bit pressure and the overall system can be calibrated to read out directly in pounds or pounds per square inch or otherwise as desired.

Typically the radioactive sources 50 are gamma ray sources, preferably line sources of cesium or krypton. The radiation detector typically is a Geiger-Muller counter tube. The signal processor receiving the output of the radiation detector typically provides an output varying in the range of 0 to 5 volts DC for a one inch movement of one pipe section relative to the other, with a pressure range of 0 to 10,000 pounds. While a muliplexing system for transmitting the detector signal to the surface is illustrated, the signal could be transmitted directly if desired.

We claim:

1. Apparatus for measuring the pressure on a well drilling bit connected to a drilling platform by a string of drill pipe, including in combination:

first and second sections of drill pipe having telescoping ends with said first section end sliding in said second section end;

a spring positioned between said first and second sections urging said second section away from said first section;

a probe positioned within said sections of drill pipe;

radioactive source means mounted on said second section end;

radiation detector means mounted in said probe, with said first section end including window means providing a radiation path between said source and detector means; and circuit means having said detector means connected as an input and providing as an output a signal varying as a function of radiation intensity at said detector means and hence of the position of said first section relative to said second section, the compression of said spring, and the pressure on said bit.

2. Apparatus as defined in claim 1 wherein said radioactive source means includes a plurality of separate radioactive sources substantially equally spaced from each other on said second section end, and said window means includes a separate window in said first section and corresponding to each of said radioactive sources.

3. Apparatus as defined in claim 1 including means interconnecting said first and second sections limiting movement of said second section away from said first section.

4. Apparatus as defined in claim 3 wherein said spring is a coil spring positioned about said probe within said second section.

5. Apparatus as defined in claim 1 including:

a signal multiplexer mounted in said probe and having the output of said circuit means as an input;

a demultiplexer mounted remote from said probe and connected to said multiplexer by a cable passing up said drill string; and a display unit having an output of said demultiplexer as an input for displaying drill bit pressure.

6. Apparatus for measuring the pressure on a well drilling bit connected to a drilling platform by a string of drill pipe, including in combination:

first and second sections of drill pipe;

spring means urging said second section away from said first section;

a probe positioned within said string of drill pipe;

radioactive source means mounted on said second section;

radiation detector means mounted in said probe, with said first section including window means providing a radiation path between said source and detector means; and circuit means having said detector means connected as an input and providing as an output a signal varying as a function of radiation intensity at said detector means and hence of the position of said first section relative to said second section, the compression of said spring, and the pressure on said bit.

* * * * *